UNITED STATES PATENT OFFICE.

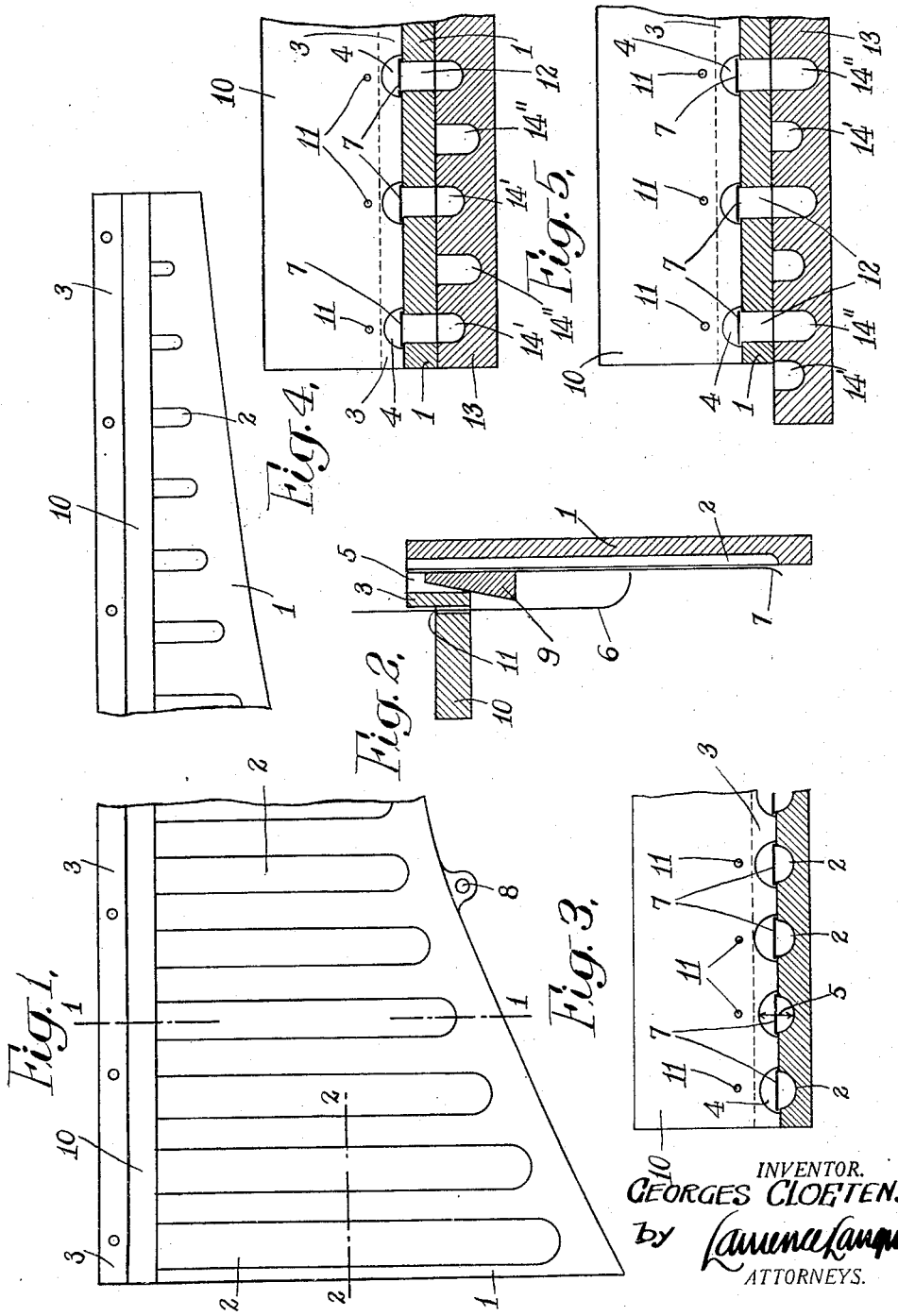

GEORGES CLOETENS, OF BRUSSELS, BELGIUM.

REED-ORGAN.

1,202,032.   Specification of Letters Patent.   Patented Oct. 24, 1916.

Application filed October 29, 1913. Serial No. 798,045.

*To all whom it may concern:*

Be it known that I, GEORGES CLOETENS, dealer in organs, a citizen of the Kingdom of Belgium, and resident of Brussels, Belgium, have invented certain new and useful Improvements in Reed-Organs; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to beating reed organs and has for its object to provide a simplified form of beating reed.

The invention consists in the novel combinations hereinafter described and claimed.

In order that my invention may be readily understood and carried into effect, I will now proceed to describe the same with reference to a preferred embodiment which is shown in the accompanying drawings in which:—

Figure 1 is an elevation partly broken away of a plate comprising the reeds of a complete set, the reed tongues being omitted. Fig. 2 is a section on the line 1—1 of Fig. 1, the accessories that are not shown in Fig. 1 being here represented. Fig. 3 is a section on the line 2—2 of Fig. 1. Figs. 4 and 5 are sections, similar to that of Fig. 3, showing means for varying the musical effects produced.

The invention provides, broadly, a mounting for beating reed organs comprising a reed plate formed with grooves open at one end, and reed tongues on said plate overlying said grooves.

In the embodiment of the invention illustrated, I form a plurality of grooves in a reed plate 1, the dimensions of said grooves corresponding to the various reeds to be produced. Upon the plate 1 is fixed a plate 3 which is also formed with grooves 4, in such a manner that each groove 2 terminates in a tubular portion 5. The portion 10 of the plate 3 serves as support for the tuning wires 6 and the tongues 7 are fixed by means of wedges 9 entering the tubular portions 5. It will of course be understood that the plates 1 and 3 may, if desired, be formed in a single piece. Holes 8 serve for securing the device in the chest or box for the compressed or suction air. The plates 1 and 3 may be formed of any appropriate material, such for example as metal, wood, ebonite, or the like.

In cases in which it is considered necessary to provide for modifying the depth of the grooves, as shown in Figs. 4 and 5, the grooves in the plate 1 supporting the tongues 7 are replaced by slots 12 passing through this plate. These slots are closed on the side opposite the tongues 7, in such a manner as to form grooves, by means of a plate 13 covering the plate 1, this plate 13 being formed with grooves 14', 14'' of different depth. By forming this plate with two or more grooves 14', 14'' of different depths for each reed, it is possible by sliding this plate 13 upon the plate 1, (Fig. 5) or by sliding the plate 1 upon the plate 13 to change the dimensions of the reeds.

I wish it to be understood that I do not claim a mounting for free reeds, as the claims which follow are directed to the generically novel features of my invention in connection with beating reeds.

What I claim is:

1. A mounting for beating reeds comprising a reed plate formed with grooves open at one end, and beating reed tongues on said plate overlying said grooves.

2. A mounting for beating reeds comprising the combination of a reed plate formed with grooves open at one end and of different length, and beating reed tongues mounted on said plate to overlie said grooves.

3. A mounting for beating reeds comprising a reed plate formed with grooves open at one end and common to a plurality of reed tongues, in combination with a grooved supporting member separate from said plate but connected therewith with its grooves overlying portions of the grooves of said plate.

4. A mounting for beating reeds comprising the combination of a grooved reed plate, a grooved supporting member arranged with its grooves overlying portions of the grooves of said reed plate, a plurality of beating reed tongues, and tongue holding means engaging said reed tongues and located in the overlying grooves of said reed plate and said supporting member.

5. A mounting for beating reeds comprising the combination of a grooved reed plate, beating reed tongues mounted on said plate to overlie the grooves therein, tuning wires bearing on said tongues, and a further plate connected with said reed plate for supporting said tuning wires.

6. A mounting for beating reeds comprising the combination of a grooved reed plate, a plurality of beating reed tongues, and a supporting plate coöperating with said reed plate, to hold said tongues in operative relation with the grooves in said reed plate.

7. A mounting for beating reeds comprising the combination of a grooved reed plate, a supporting plate having a grooved edge arranged with its grooves registering with the grooves in said reed plate, a plurality of beating reed tongues interposed between said first and second plate and held in operative position with relation to the grooves on said first plate, and tuning wires bearing on said reeds and supported by said second plate.

8. A mounting for beating reeds comprising members forming the reed grooves, and means for varying the depth of said grooves.

9. A mounting for beating reeds formed with a plurality of grooves open at one end, beating reed tongues mounted on said mounting to overlie the grooves therein, and means for varying the depth of said grooves.

In testimony whereof I affix my signature in presence of two witnesses.

GEORGES CLOETENS.

Copies of this patent may be obtained for five cents each, by addressing the "Commissioner of Patents, Washington, D. C."